United States Patent [19]

Arnon et al.

[11] Patent Number: 5,029,167

[45] Date of Patent: Jul. 2, 1991

[54] COEFFICIENT STORAGE REDUCTION IN ADAPTIVE FILTERS IN ECHO CANCELLERS OR DECISION FEEDBACK EQUALIZERS

[75] Inventors: Ephraim Arnon, Ottawa; Michael W. Chomik, Ontario, both of Canada

[73] Assignee: Northern Telecom Limited, Montreal, Canada

[21] Appl. No.: 406,414

[22] Filed: Sep. 13, 1989

[51] Int. Cl.$^5$ .............................................. H04J 3/00
[52] U.S. Cl. ................................... 370/32.1; 379/406; 379/410; 379/411; 375/11; 375/14
[58] Field of Search ..................... 379/406, 410, 411; 370/32.1; 375/11, 12, 14

[56] References Cited

U.S. PATENT DOCUMENTS 3,978,435  8/1976  Luvison et al. ................... 375/14
4,605,826  8/1986  Kanemasa .
4,785,445  11/1988  Guidoux ............................. 379/411

FOREIGN PATENT DOCUMENTS 1250035  2/1989  Canada .

OTHER PUBLICATIONS

"Mixed Recursive Echo Canceller (MREC)", by C. Mogavero et al., in Proc. Globecom 1986, Dec. 1986, pp. 44–48.
"Architecture for Fully Integrated Echo Canceller LSI based on Digital Signal Processing", by H. Takatori et al., in Proc. ICC 1987, Jun. 1987, 601–605.
A New Digital Echo Canceler for Two-Wire Subscriber Lines, by Nils Holte et al., IEEE Transactions on Communications, vol. Com 29, No. 11–Nov. 1981, pp. 1573–81.

Primary Examiner—Jin F. Ng
Assistant Examiner—Jhancy Augustus
Attorney, Agent, or Firm—Foley & Lardner

[57] ABSTRACT

In an adaptive digital filter for use in an echo canceller or a decision feedback equalizer in a digital data transmission system, reduced storage and lower arithmetic processing speed are attained by subsampling, in effect, the later parts of the waveform, i.e. the tail portion which changes relatively slowly. Such an adaptive digital filter comprises a storage device, such as a shift register, for storing a group of bits which represents symbols being transmitted in the digital data signal, a first stage for deriving an estimate for a first group of the stored bits, and at least one second stage for deriving an estimate for a second group of stored bits occurring earlier in time than the first group. The second stage has a summing device for summing the second group of bits to generate a quantity representing the cumulative sum of the symbols represented in the group, and a multiplier for multiplying the quantity by a single coefficient to obtain an echo estimate for the second stage. The estimates for the first and second echo canceller stages are summed, then subtracted from the received digital data signal. There will usually be a plurality of such second stages, each operative on a different group of bits of the digital data signal.

20 Claims, 4 Drawing Sheets

COEFFICIENT STORAGE REDUCTION IN ADAPTIVE FILTERS IN ECHO CANCELLERS OR DECISION FEEDBACK EQUALIZERS

FIELD OF THE INVENTION

The invention relates to adaptive filters for use in equalizers and echo cancellers for digital transmission systems, and to equalizers and echo cancellers including such adaptive filters.

BACKGROUND

In such systems, the length of time over which the adaptive filter must operate is determined by the pulse tail length, i.e. the time taken for the pulse tail to decay to an acceptably small level. The part of the tail most distant from the main pulse occurs later in time. Conversely, the tail is created by pulses which occurred earlier in time. The adaptive filter must have a sufficient number of taps to reach the point in time where the tail has decayed by the desired amount.

If the line code used for the digital transmission has a high low-frequency content, as is the case with 2B1Q (two binary, one quaternary), the line code to be used in ISDN (Integrated Services Digital Network) Basic Access, the amplitude of the tail can still be substantial many symbol periods in time after the main pulse occurred.

In a conventional equalizer or echo canceller, a long tail requires a large number of taps, and hence faster storage access time and arithmetic processing for calculating the echo estimate and updating the coefficients. Memory and processing speed requirements increase still further if multiple samples per symbol period, or multiple coefficients per tap, are required (as for multi-level line codes). For a conventional transversal filter in which individual symbols are multiplied by respective coefficients, then summed, the number of taps required for the aforementioned long tails could result in excessive processing speeds or circuit complexity. Likewise, for a memory-type adaptive filter, the size of memory would be prohibitive, even if the memory were split, as disclosed by Kanesmasa et al in U.S. Pat. No. 4,605,826, issued Aug. 12, 1986 and entitled "Echo Canceller with Cascaded Filter Structure" and by M. Koohgoli in Canadian patent No. 1,250,035 issued Feb. 14, 1989 to Northern Telecom Limited and entitled "Split-Memory Echo Canceller", both of which documents are incorporated herein by reference.

One common method of reducing circuit complexity while handling long pulse tails is to use an Infinite Impulse Response (IIR) tap in the adaptive filter, as described in the papers by C. Mogavero, G. Norvu, G. Paschetta entitled "Mixed Recursive Echo Canceller (MREC)", in Proc. Globecom 1986, December 1986, pp 44-48, and by Takatori et al, entitled "Architecture for Fully Integrated Echo Canceller LSI based on Digital Signal Processing", in Proc. ICC 1987, June 1987, pp601-605, both of which documents are incorporated by reference. A disadvantage of this approach, however, is that it requires the decay time constant of the pulse tail to be precisely known in advance.

An object of the present invention is to provide an adaptive digital filter for an echo canceller or decision feedback equalizer in a digital data transmission system, which requires less storage and lower arithmetic processing speed than the adaptive filters discussed hereinbefore, and does not require a precise knowledge of the pulse tail characteristic.

SUMMARY OF THE INVENTION

According to one aspect of the present invention, an adaptive digital filter for an echo canceller or decision feedback equalizer in a digital data transmission system comprises:

storage means for storing a series of bits of a digital data signal, said bits representing symbols;

first adaptive digital filter means for deriving from a first group of said bits an estimate representing a portion of a received signal, which portion is to be cancelled;

at least one second adaptive digital filter means for deriving from a second group of said stored bits occurring earlier in time than said first group an estimate representing a further portion of said received signal, which further portion is to be cancelled, the or each said second adaptive filter means having summing means for summing said second group of bits to generate a quantity representing the cumulative sum of the symbols represented in said second group, and means for multiplying said quantity by a coefficient to obtain an estimate for said second group;

said adaptive digital filter further comprising second summing means for summing the estimates for the first and second groups to provide an estimate sum for subtraction from a received digital data signal.

In an echo canceller embodying an adaptive digital filter according to the invention, the storage means is arranged to store bits of said digital data signal to be transmitted.

In a decision feedback equalizer embodying an adaptive filter according to the invention, the storage means is arranged to store bits derived from said received digital data signal after data recovery has been effected.

In preferred embodiments, the adaptive digital filter comprises a plurality of said second adaptive digital filter means, each operative on a different group of bits of said digital data signal, said second summing means serving to sum the respective outputs of said plurality of second adaptive digital filter means. The first adaptive digital filter means may comprise any suitable kind, such as a memory-type adaptive digital filter or a transversal filter which retreats every symbol separately.

According to a second aspect of the invention, there is provided a method of filtering a digital signal for equalization or echo cancellation in a digital data transmission system, comprising the steps of:

storing a series of bits of a transmitted digital data signal, said bits representing symbols being transmitted;

deriving an estimate for a first group of said stored, said estimate representing a portion of a received signal, which portion is to be cancelled;

deriving for a second group of said stored bits occurring earlier in time than said first group an estimate representing a further portion of said received signal, which further portion is to be cancelled, said step of deriving said estimate for said second group comprising summing said second group of bits to generate a quantity representing the cumulative sum of the symbols represented in said second group, and multiplying said quantity by a coefficient to obtain said estimate for said second group;

said method further comprising summing said estimates for said first and second groups and subtracting the sum so produced from said received digital signal.

The invention is predicated upon the later part of the tail, i.e. the part most distant from the main pulse, being almost horizontal with respect to time, i.e. decaying very slowly and so of almost constant value. Assigning one coefficient to a group of symbols, representing a sub-interval of the echo canceller time length, in essence subsamples the later, flatter, portion of the tail. At the same time, the earlier part of the signal, i.e. closer to the originating pulse, may have one or more coefficients for each symbol, as is usual, effectively sampling the more rapidly changing part of the signal at a higher rate.

In some systems, a plurality of bits are used to represent each symbol. For example, a 2B1Q signal is generated from dibits comprising one bit for magnitude and a second bit for sign. In such systems, embodiments of the invention will sum the groups of bits in such a way that the final sum representing the cumulative sum of the symbols preserves the magnitude and sign information.

BRIEF DESCRIPTION OF THE DRAWINGS

Embodiments of the invention will now be described, by way of example only, and with reference to the accompanying drawings, in which.

DETAILED DESCRIPTION OF A PREFERRED EMBODIMENT

Figure 1:
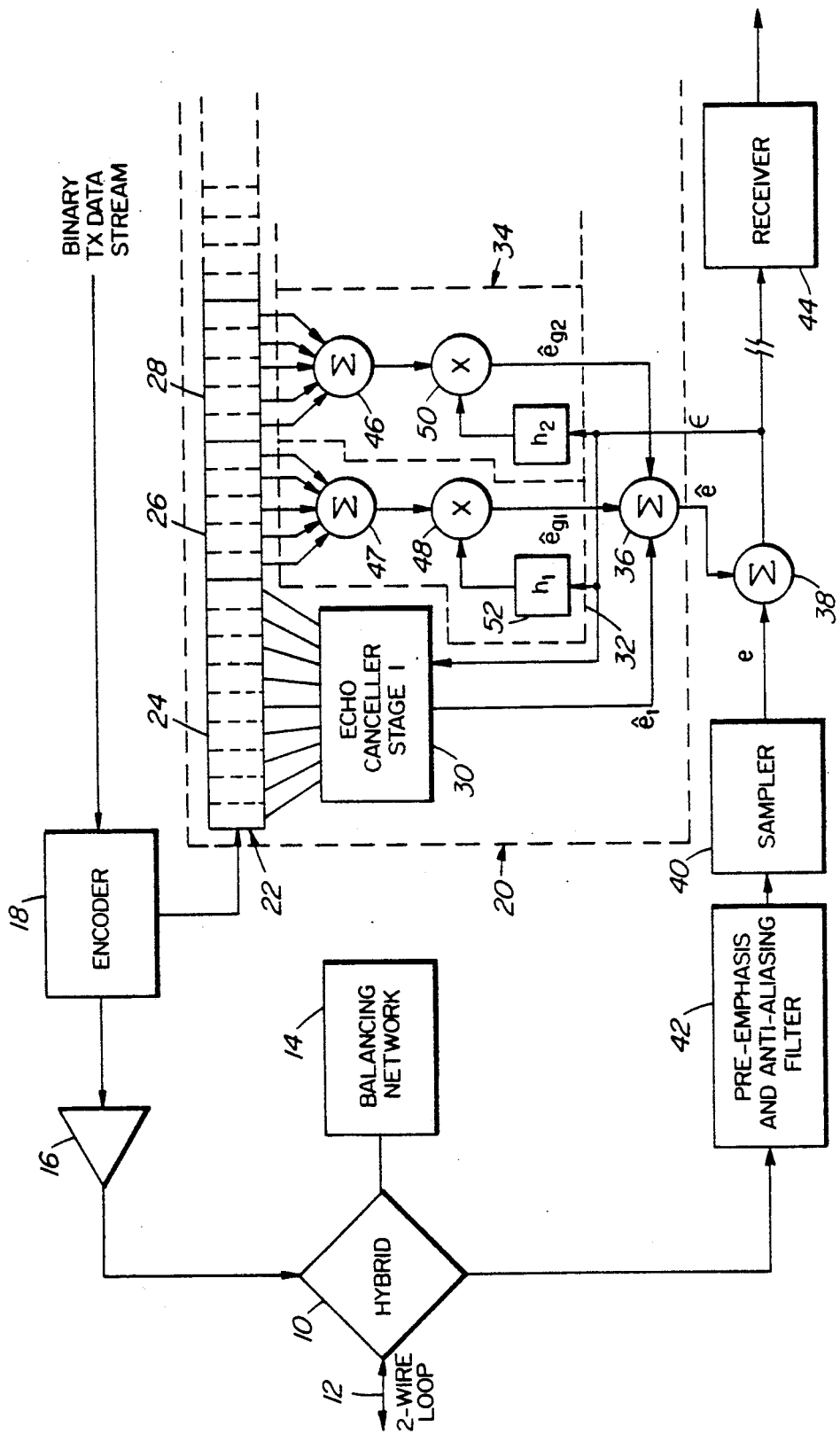
FIG. 1 is a block schematic diagram of a transceiver including an echo canceller embodying an adaptive digital filter for use in a digital data transmission system.

FIG. 1 shows a transceiver which constitutes the user interface of, for example, a central office switch in a telephone system. The transceiver comprises a hybrid circuit 10. One port of the hybrid circuit 10 is connected to a two-wire subscriber loop 12 and the opposite port is connected to a balancing network 14. The third port is connected to the output of a power transmitter amplifier 16, which may be of conventional construction and so will not be described in detail. The input of the power transmitter amplifier 16 is connected to the output of an encoder 18 which takes a binary data stream applied to its input and encodes it as 2B1Q (two binary, one quaternary) data for transmission onto the subscriber loop 12.

In the 2B1Q signal, four levels +3, +1, −1, and −3 are represented by dibits 10, 11, 01, and 00, respectively. In each dibit the first bit represents sign and the second bit represents magnitude. The encoded signal supplied to the power transmitter amplifier 16 is at half the rate of the input binary data stream.

The encoder 18 supplies a corresponding signal to an echo canceller 20, which comprises shift register means 22, divided into three segments 24, 26, and 28, respectively. Three echo canceller stages 30, 32, and 34, are connected to the shift register segments 24, 26, and 28, respectively, and have their outputs connected to a summer 36. The output from summer 36 is the echo estimate ê which a second summer 38 sums with the output e of sampler 40. The input to sampler 40 is the digital data signal received from the subscriber loop 12 and filtered by preemphasis and anti-aliasing filter 42 connected to the fourth port of the hybrid circuit 10. The output from the sampler 40 actually consists of both the received signal and the echo component e, but only the echo component e is correlated with the transmitted signal. The echo canceller 20 will not find correlation with the received signal which therefore will be ignored. The output of summer 38 is applied to all three stages 30, 32 and 34 of the echo canceller 20 as an updating signal ε for updating the coefficients, by methods which are generally known and will not be elaborated upon further. The output of summer 38 is also applied to a receiver 44 which converts the echo-cancelled signal back to binary received data.

The segments 26 and 28 of the shift register 22 each have five taps connected to summers 46 and 47, respectively. The outputs of the summers 46 and 47 are applied to multipliers 48 and 50, respectively. Multipliers 48 and 50 also have inputs connected to coefficient storage means 52 and 54, respectively. Each of the coefficient storage means 52 and 54 stores a twenty-four bit word which is multiplied by the output of the corresponding one of summers 46 and 47 to provide echo estimate signals $ê_{g1}$ and $ê_{g2}$, respectively. Each of the summers 46 and 47 generates a quantity representing the cumulative sum of the symbols represented by the group of bits in the corresponding segment of the shift register 22. Although only two shift-register segments, each of five cells, are shown in FIG. 1, to simplify the drawing, a practical echo canceller might have many more segments as deemed necessary.

It should be noted that the value at the output of each of the summers 46 and 47, being the sum of all the values of the five taps, can take a number of different values depending on the particular signal combinations. For example, if all five symbols are at the +3 level for those five symbol periods, the output will be +15. The three echo estimates, $ê_1$, $ê_{g1}$, and $ê_{g2}$, are summed by summer 36 to give the echo estimate ê, which is subtracted from the output of the sampler 40 by summer 38.

The first echo canceller stage 30 may be a conventional memory-type echo canceller, or a transversal filter echo canceller, which will multiply a representation of each individual symbol of the data stream by its own coefficient. The length of this first stage, i.e. the number of shift register taps it spans, will be chosen to suit the particular situation, the intention being that the first stage, with at least one coefficient per tap, will be operative over the faster-changing portion of the pulse waveform (see FIG. 3). Stages 32 and 34 will then operate over slowly-changing parts of the pulse vis. the tail portion.

Figure 2:
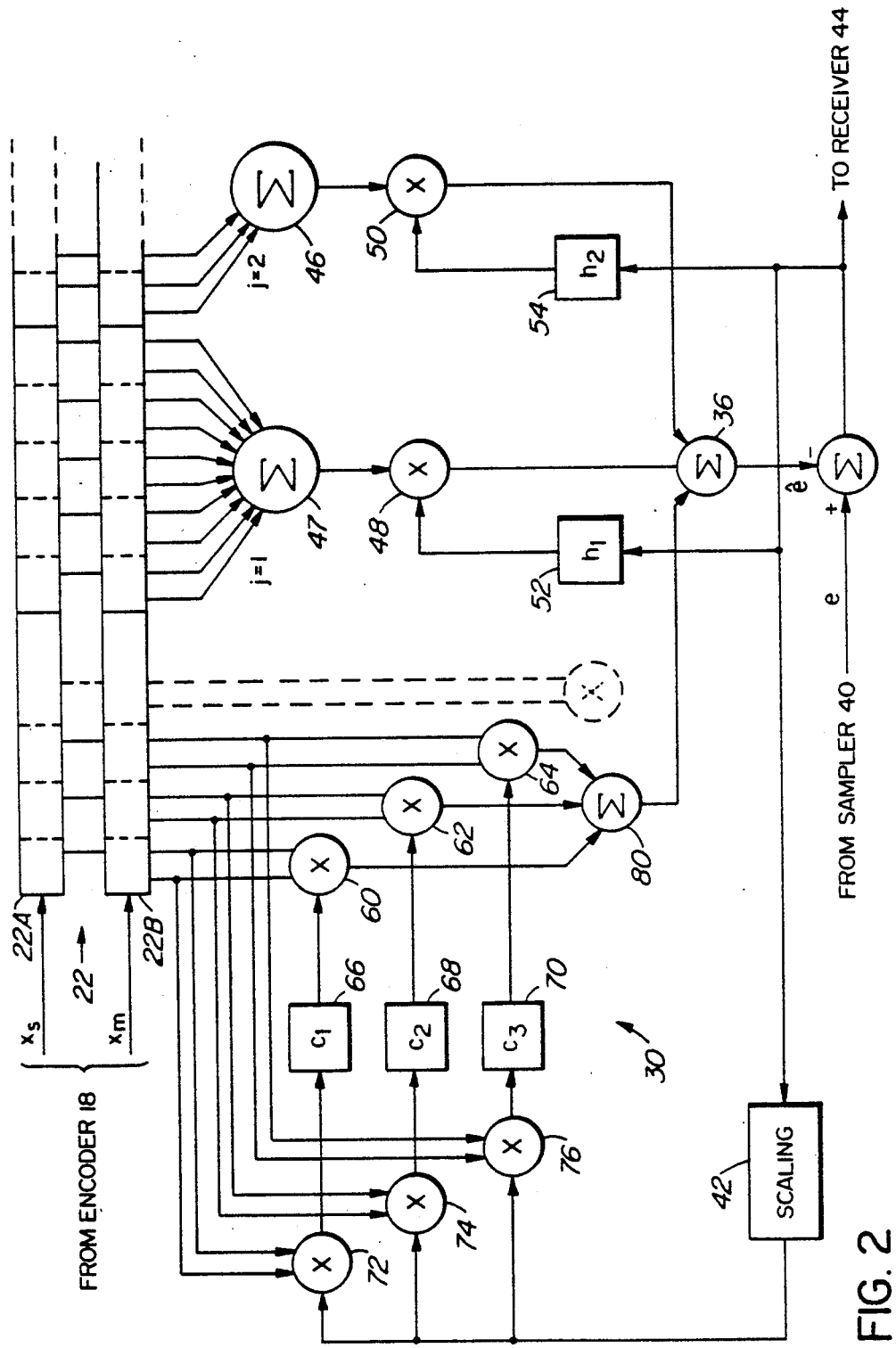
FIG. 2 is a detail block schematic diagram of a part of the echo canceller.

It should be appreciated that the shift register means 22 is not a single binary shift register since it must accommodate four different states for a given tap. This is achieved by providing two shift registers in parallel, as illustrated in FIG. 2, which also shows the first stage echo canceller 30 in more detail. The shift register means 22 is shown to comprise two parallel shift registers 22A and 22B. Both are connected to the encoder 18, each to receive an 80 kB/s bit stream. Shift register 22A receives sign information $X_S$ and shift register 22B receives magnitude information $X_m$, the corresponding cells in the shift registers 22A and 22B representing a dibit, 11, 10, 01, or 00 as discussed previously. Each pair of cells of the shift registers 22A and 22B thus form a single tap of the shift register means 22. It should be appreciated that, of the four possible levels for the 2B1Q signal, only one will be attained at any instant.

The first echo canceller stage 30 has the conventional transversal filter echo canceller form. Each pair of cells of the shift registers 22A and 22B are connected, in common, to multipliers 60, 62 and 64 for multiplication by coefficients $C_1$, $C_2$, $C_3$, respectively, derived from a corresponding plurality of coefficient storage means 66, 68 and 70. It should be appreciated that although only three coefficients are shown, in practice there will be at least as many as there are taps.

In addition to its inputs connected to the corresponding taps of the shift registers 22A and 22B, each of the multipliers 60, 62, and 64, has a third input connected to the corresponding one of coefficient storage means 66, 68 and 70. The inputs of coefficient storage means 66, 68 and 70 are connected to multipliers 72, 74 and 76, respectively. Each of the multipliers 72, 74 and 76 multiplies the value from the corresponding tap of the shift register means 22 by the updating signal $\epsilon$ from summer 38 (FIG. 1), after scaling by scaling means 42.

Figure 3:
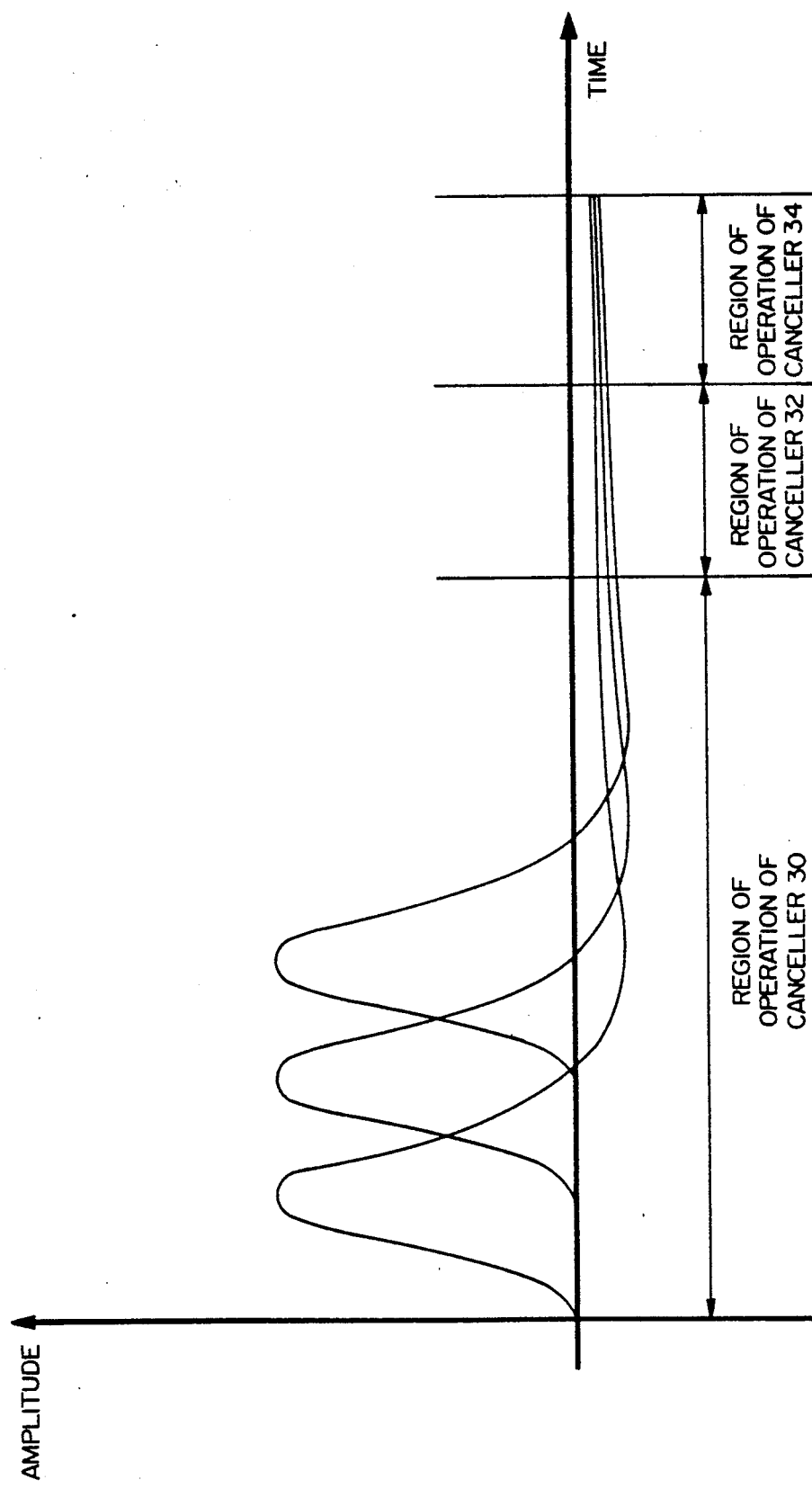
FIG. 3 is a representation of a typical echo waveform in the digital data transmission system.

Each coefficient storage means 66, 68 and 70 stores a twenty-four bit word which is multiplied by the output of the tap of the shift register 22. A summer 80 sums the respective outputs of the multipliers 60, 62 and 64 to give the echo estimate $ê_1$ for the first stage 30. Because this first stage has a coefficient assigned to each tap, the early part of the signal, which is changing relatively rapidly as shown in FIG. 3, is accurately mapped.

The estimate $ê_1$ for the first stage is produced in accordance with the general expression:

$$e_1 = \sum_i X_i C_i \qquad [1]$$

where $X_i$ is the value in the shift register means 22 at tap position i; and $C_i$ is the coefficient corresponding to the same tap position.

For each of the stages 32 and 34, with grouped taps, the echo estimate is derived in accordance with the general expression:

$$e_{gj} = h_j \left( \sum_j X_i \right) \qquad [2]$$

where j identifies the group;

$h_j$ *is the single coefficient for that group;*

$ê_{gj}$ is the echo estimate for that group; and $$\sum_j X_i$$

is the representation of the summed values of the symbols at taps i in group j.

In the specific example, the final echo estimate $ê$ then is $$e = e_1 + e_{g1} + e_{g2} \qquad [3]$$

For the second and third echo canceller stages 32 and 34 in which each of the coefficients is applied to a group of taps, the updating will be in accordance with the algorithm:

$$\delta h_j = K\epsilon \left( \sum_j X_1 \right) \qquad [4]$$

$h_j(\text{new}) = h_j(\text{previous}) + \delta h_j$ where $\delta h_j$ is the value by which $h_j$ is to be updated K is a multiplicative constant $\epsilon$ is the error value from the output of summer 38; and j, $h_j$, and $$\sum_j X_i$$

are as defined above.

It should be noted that when each group contains only one tap, the echo estimate and updating equations become the same as the equations for the transversal filter.

FIG. 3 illustrates pictorially how taking the sum of the symbols in each group will yield a valid echo estimate.

Considering, for example, the time region of operation for canceller 32, it can be seen that, for the three pulses shown, the tail magnitude will be substantially three times the magnitude of the tail from a single pulse, due to superposition. The coefficient $h_1$ (FIG. 1) represents the magnitude of the single pulse tail in this region. Thus, $h_1$ is multiplied by the sum of the estimate of the total tail magnitude. Note that were one of the pulses negative, the sum of the symbols in the group would be $+1$, two tails would cancel, and the total tail height would be equal to $h_1$ instead of $3 \cdot h_1$.

It should be appreciated that, to facilitate the description, the mathematical terms have been simplified. Thus in equation [2] and [4] is a shorthand way of expressing "Sum of all the values $X_i$ in group j". More rigorously:

For a group j comprising N tap positions, between shift register positions $i = i_{start(j)}$ and $i = i_{start(j)+N-1}$, inclusive, $$\sum_j X_i \text{ is really} \sum_{i=i_{start(j)}}^{i=i_{start(j)}+N-1} X_i \qquad [5]$$

where, clearly, the starting position $i_{start(j)}$ is different for different groups "j".

It should be noted that these equations apply generally to both echo canceller and equalizer embodiments. In the former case, the quantity $X_i$ is the locally transmitted signal bits and in the latter case the received signal bits after detection or decoding.

Thus equation [2] would be:

$$e_{gj} = h_j \sum_{i=i_{start(j)}}^{i=i_{start(j)}+N-1} X_i, \qquad [6]$$

or $$e_{g1} = h_1 \sum_{i=i_{start(1)}}^{i=i_{start(1)}+N-1} X_i \qquad [7]$$

$$e_{g2} = h_2 \sum_{i=i_{start(2)}}^{i=i_{start(2)}+N-1} X_i \text{ etc.} \qquad [8]$$

where j=1, 2, 3 ... refers to group.
Equation [4] would be:

$$\delta h_j = K\epsilon \sum_{i=i_{start(j)}}^{i=i_{start(j)}+N-1} X_i \quad [9]$$

or;

$$\delta h_1 = K\epsilon \sum_{i=i_{start(1)}}^{i=i_{start(1)}+N-1} X_i \quad [10]$$

$$\delta h_2 = K\epsilon \sum_{i=i_{start(2)}}^{i=i_{start(2)}+N-1} X_i \quad [11]$$

It should be noted that the number of taps N need not be the same in each group i.e. different groups could comprise different numbers of taps, as dictated by the application requirements. It becomes clear that, if N=1, each group is only one tap long, and this is identical to the transversal filter.

Figure 4:
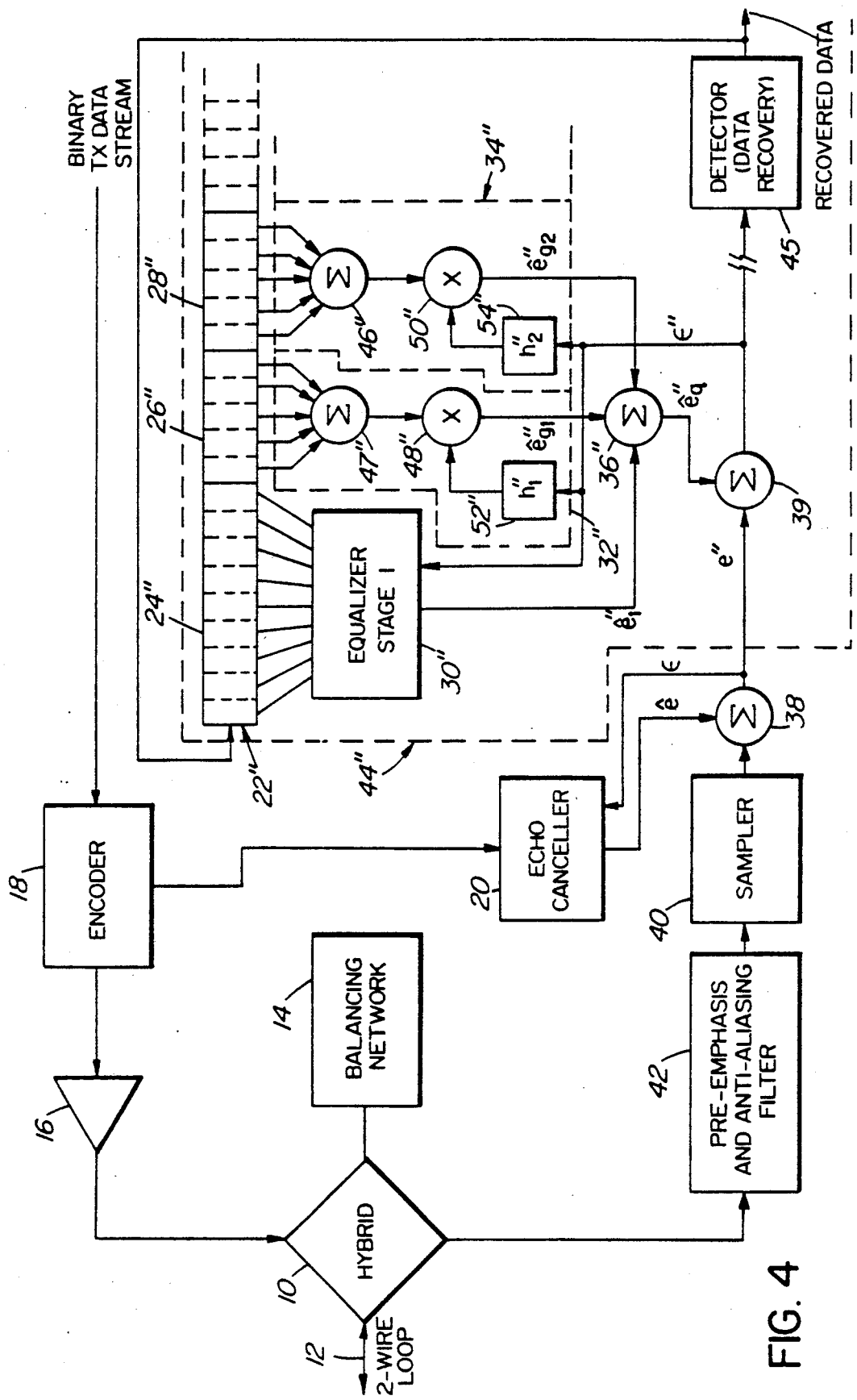
FIG. 4 is a block schematic diagram corresponding to FIG. 1, but showing a decision feedback equalizer embodying an adaptive digital filter for use in a digital data transmission system.

The adaptive digital filter described above is not limited in application to an echo canceller, but may be used in a decision feedback equalizer. Referring now to FIG. 4, which corresponds generally to FIG. 1 but shows the transceiver in more detail, those components which are common to both embodiments have the same reference numeral while those which merely correspond are identified by a double prime. The transceiver has an echo canceller 20 shown as a box since internally it is as shown in FIG. 1. A decision feedback equalizer 44" is simlar in construction to the echo canceller 20 and so will not be described in detail. It will be appreciated by one skilled in the art, however, that in the first stage, identified as equalizer stage 1 and reference 30", there will be no cancellation of the main pulse, since the equalizer seeks to cancel everything but the main pulse.

In the receiver 44", the output of summer 38 (FIGS. 1 and 4) is supplied to a summer 39, which subtracts from it the output of the equalizer $\hat{e}_q$". The equalized output of summer 39 is then supplied to data recovery or detector means 45.

It should be noted that, whereas the echo canceller 20 derives its input, the outgoing or transmitted signal, from the encoder 18, the equalizer derives its input, the recovered data signal, from the output of the data recovery detector 45.

Various modifications and alternatives are comprehended by the present invention. For example, the hybrid circuit 10 could be a hybrid transformer or could be electronic. Although the equalizer embodying the invention has been shown and described in a transceiver which has an echo canceller also embodying the invention, it should be appreciated that it could be used independently.

We claim:
1. An adaptive digital filter for use in decision feedback equalizer or echo canceller in a digital data transmission system, comprising:
   storage means for storing a series of bits of a digital data signal, said bits representing symbols;
   a first adaptive digital filter stage for deriving for a first group of said stored bits an estimate representing a portion of a received digital data signal, which portion is to be cancelled;
   at least one second adaptive digital filter stage for deriving for a second group of bits occurring earlier in time than said first group an estimate representing a portion of said received signal, which second portion is to be cancelled;
   said second adaptive filter stage having summing means for summing said second group of bits to generate a quantity representing the sum of all of the symbols represented in said second group, and means for multiplying said quantity by a coefficient to obtain an estimate for said second group;
   said adaptive digital filter further comprising second summing means for summing said estimates for said first and second stages for subtraction from said received digital data signal.

2. An adaptive digital filter as defined in claim 1, comprising:
   a plurality of said second adaptive filter stages, each operative on a different group of bits of said digital data signal, said second summing means serving to sum the outputs of said plurality of said second adaptive digital filter stages.

3. An echo canceller for a digital data transmission system, comprising:
   storage means for storing a series of bits of a transmitted digital data signal, said bits representing symbols being transmitted;
   a first echo canceller stage for deriving for a first group of said stored bits an echo estimate representing a portion of a received signal, which portion is to be cancelled;
   at least one second echo canceller stage for deriving for a second group of said stored bits occurring earlier in time than said first group an echo estimate representing a second portion of said received signal, which second portion is to be cancelled, said second echo canceller stage having summing means for summing said second group of bits to generate a quantity representing the sum of all of the symbols represented in said second group, and means for multiplying said quantity by a coefficient to obtain an echo estimate for said second group;
   said echo canceller further comprising second summing means for summing said echo estimates for said first and second stages and means for subtracting the summed echo estimates from said received digital signal.

4. An echo canceller as defined in claim 3, comprising:
   a plurality of said second echo canceller stages, each operative on a different group of bits of said digital data signal, said summing means serving to sum the outputs of said plurality of said second echo cancellers.

5. An echo canceller as defined in claim 3 or 4, wherein:
   said first echo canceller stage comprises a memory-type echo canceller.

6. An echo canceller as defined in claim 3 or 4, wherein said first canceller stage comprises a transversal filter echo canceller.

7. A decision feedback equalizer for a digital data transmission system, comprising:
   storage means for storing a series of bits of a received digital data signal after data recovery therefrom, said bits representing symbols being transmitted from a remote transmitter;
   a first equalizer stage for deriving for a first group of said stored bits an estimate representing a portion of said received digital data signal, which portion is to be cancelled;

at least one second equalizer stage for deriving for a second group of said stored bits occurring earlier in time than said first group an estimate representing a second portion of said received signal, which second portion is to be cancelled, said second equalizer stage having summing means for summing said second group of bits to generate a quantity representing the sum of all of the symbols represented in said second group, and means for multiplying said quantity by a coefficient to obtain an estimate for said second group;

said decision feedback equalizer means further comprising second summing means for summing said estimates from said first and second stages and means for subtracting the summed estimates from said received digital data signal.

8. A decision feedback equalizer as defined in claim 7, comprising:
a plurality of said second equalizer stages, each operative on a different group of bits of said digital data signal, said second summing means serving to sum the outputs of said plurality of said second equalizer stages.

9. A decision feedback equalizer as defined in claim 7 or 8, wherein said first equalizer stage comprises a memory-type equalizer.

10. A decision feedback equalizer as defined in claim 7 or 8, wherein said first equalizer stage comprises a transversal filter equalizer.

11. A method of adaptively filtering a digital data signal for equalization or echo cancellation in a digital data transmission system, comprising:
storing a series of bits of a digital data signal, said bits representing symbols;
employing a first adaptive digital filter stage to derive for a first group of said stored bits an estimate representing a portion of a received signal, which portion is to be cancelled;
employing a second adaptive digital filter stage to derive for a second group of bits occurring earlier in time than said first group an estimate representing a second portion of said received signal, which second portion is to be cancelled;
derivation of said estimate for said second group of bits comprising the steps of:
summing said second group of bits to generate a quantity representing the sum of all of the symbols represented in said second group; and
multiplying said quantity by a coefficient to obtain an estimate for said second group;
said method further comprising summing said estimates for said first and second groups and subtracting such summed estimates from said received digital data signal.

12. A method as defined in claim 11, comprising employing a plurality of said second adaptive filters to derive a plurality of estimates for a corresponding plurality of said second groups of bits, and summing said plurality of estimates with said estimate for said first group of bits.

13. A method of cancelling echo in a digital signal in a digital data transmission system, comprising:
storing a series of bits of a transmitted digital data signal, said bits representing symbols being transmitted; deriving for a first group of said stored bits an echo estimate representing a portion of a received digital data signal, which portion is to be cancelled; and
deriving for a second group of said stored bits occurring earlier in time than said first group an echo estimate representing a portion of said digital data signal, which portion is to be cancelled;
said step of deriving said echo estimate for said second group comprising summing said second group of bits to generate a quantity representing the sum of all of the symbols represented in said second group, and multiplying said quantity by a coefficient to obtain said echo estimate for said second group;
said method further comprising summing said echo estimates for said first and second groups and subtracting the sum so produced from said received digital signal.

14. A method as defined in claim 13, comprising:
deriving a plurality of echo estimates, each for a corresponding one of a plurality of groups of bits of said digital data signal;
summing said plurality of echo estimates with that of said first group; and
subtracting the sum so produced from said digital data signal.

15. A method as defined in claim 13 or 14, wherein the echo estimate for said first group of bits is derived using a memory-type echo canceller.

16. A method as defined in claim 13 or 14, wherein the echo estimate for said first group of bits is derived using a transversal filter echo canceller.

17. A method of equalizing a received digital data signal in a digital data transmission system, comprising:
storing a series of bits of said received digital data signal after data recovery therefrom, said bits representing symbols;
deriving for a first group of said stored bits an estimate representing a portion of said received digital data signal, which portion is to be cancelled; and
deriving for a second group of said stored bits occurring earlier in time than said first group an estimate representing a second portion of said received digital data signal, which second portion is to be cancelled;
said step of deriving said estimate for said second group comprising summing said second group of bits to generate a quantity representing the sum of all of the symbols represented in said second group, and multiplying said quantity by a coefficient to obtain said estimate for said second group;
said method further comprising summing said estimates for said first and second groups and subtracting the sum so produced from said received digital symbol.

18. A method as defined in claim 17, comprising:
deriving a plurality of said estimates, each for a corresponding one of a plurality of groups of bits of said digital data signal;
summing said plurality of echo estimates with that of said first group; and
subtracting the sum so produced from said received digital data signal.

19. A method as defined in claim 17 or 18, wherein the estimate for said first group of bits is derived using a memory-type equalizer.

20. A method as defined in claim 17 or 18, wherein the estimate for said first group of bits is derived using a transversal filter equalizer.

* * * * *